United States Patent
Lee et al.

(10) Patent No.: US 9,020,286 B2
(45) Date of Patent: Apr. 28, 2015

(54) APPARATUS FOR DIVIDING IMAGE DATA AND ENCODING AND DECODING IMAGE DATA IN PARALLEL, AND OPERATING METHOD OF THE SAME

(75) Inventors: Won Chang Lee, Seongnam-si (KR); Joon Ho Song, Hwaseong-si (KR); Sang Jo Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 487 days.

(21) Appl. No.: 13/067,987

(22) Filed: Jul. 13, 2011

(65) Prior Publication Data

US 2012/0027314 A1    Feb. 2, 2012

(30) Foreign Application Priority Data

Jul. 27, 2010    (KR) ........................ 10-2010-0072381

(51) Int. Cl.
| | |
|---|---|
| G06K 9/36 | (2006.01) |
| G06K 9/46 | (2006.01) |
| H04N 19/436 | (2014.01) |
| H04N 19/119 | (2014.01) |
| H04N 19/593 | (2014.01) |
| H04N 19/156 | (2014.01) |
| H04N 19/174 | (2014.01) |

(52) U.S. Cl.
CPC ........... *H04N 19/436* (2013.01); *H04N 19/119* (2013.01); *H04N 19/593* (2013.01); *H04N 19/156* (2013.01); *H04N 19/174* (2013.01)

(58) Field of Classification Search
USPC ............. 382/233, 234, 302, 304; 375/240.24, 375/240.25
See application file for complete search history.

(56) References Cited

U.S. PATENT DOCUMENTS

| | | | |
|---|---|---|---|
| 5,532,744 A * | 7/1996 | Akiwumi-Assani et al. .......................... | 348/390.1 |
| 5,557,332 A | 9/1996 | Koyanagi et al. | |
| 5,774,592 A * | 6/1998 | Takeuchi et al. ............... | 382/236 |
| 6,477,281 B2 * | 11/2002 | Mita et al. ...................... | 382/248 |
| 7,227,589 B1 | 6/2007 | Yeo et al. | |
| 2007/0189618 A1 * | 8/2007 | Bivolarski et al. ............. | 382/234 |
| 2009/0245664 A1 * | 10/2009 | Matsumoto et al. .......... | 382/234 |
| 2010/0061455 A1 * | 3/2010 | Xu et al. ................... | 375/240.13 |

FOREIGN PATENT DOCUMENTS

| | | |
|---|---|---|
| JP | 7-23397 | 1/1995 |
| KR | 10-1994-0020830 | 9/1994 |
| KR | 10-1998-0007751 | 3/1998 |
| KR | 0152019 | 6/1998 |
| KR | 10-2007-0097366 | 10/2007 |
| KR | 10-2007-0105903 | 10/2007 |
| KR | 10-2009-0079952 | 7/2009 |

* cited by examiner

*Primary Examiner* — Phuoc Tran
(74) *Attorney, Agent, or Firm* — Staas & Halsey LLP

(57) ABSTRACT

An apparatus and a method for dividing image data into partition slices and encoding and decoding the image data based on a correlation between macroblocks are provided. The macroblocks may be decoded in parallel and thus, it is possible to improve an overall image quality and processing speed.

12 Claims, 8 Drawing Sheets

400

600

APPARATUS FOR DIVIDING IMAGE DATA AND ENCODING AND DECODING IMAGE DATA IN PARALLEL, AND OPERATING METHOD OF THE SAME

CROSS-REFERENCE TO RELATED APPLICATIONS

This application claims the benefit of Korean Patent Application No. 10-2010-0072381, filed on Jul. 27, 2010, in the Korean Intellectual Property Office, the disclosure of which is incorporated herein by reference.

BACKGROUND

1. Field

Example embodiments of the following description relate to dividing image data with a high resolution into a plurality of partition slices when the image data is encoded, and decoding the image data in parallel based on a correlation between the plurality of partition slices.

2. Description of the Related Art

With developments in image-related technologies, schemes for encoding and decoding of Full High Definition (FHD) images and Ultra High Definition (UHD) images with higher resolution are in demand.

There is a demand for schemes of parallel encoding and decoding of moving images having high resolution, using a plurality of parallel calculation apparatuses. To increase an efficiency for encoding moving image information, information regarding blocks neighboring a current block to be encoded is generally used. Accordingly, the current block needs to be encoded and decoded after the neighboring blocks are completely encoded and decoded. In other words, it is impossible to encode and decode in parallel a plurality of blocks.

Recently, to encode a plurality of blocks in parallel, image data, namely a frame image, may be divided into independent slices.

Each of the slices may be encoded and decoded in parallel, since there is no correlation between the slices.

However, currently, an image quality may be damaged on an edge surface of each slice by encoding and decoding for each slice, since it is impossible to refer to image data between the slices.

For example, an H.264 Advanced Video Coding (AVC) codec may divide image data into regular slices: However, it is impossible to refer to data between macroblocks in each of the different slices and thus, a continuity of an image may be reduced, thereby causing damage to the image quality.

SUMMARY

The foregoing and/or other aspects are achieved by providing an image data processing apparatus including a partition slice dividing unit to divide image data into a plurality of partition slices, and an encoding processing unit to encode the image data based on the plurality of partition slices into which the image data is divided, wherein at least two macroblocks, included in each of at least two partition slices among the plurality of partition slices, correlate with each other.

The foregoing and/or other aspects are achieved by providing a method of operating an image data processing apparatus, including dividing image data into a plurality of partition slices, encoding the image data based on the plurality of partition slices into which the image data is divided, and decoding, in parallel, the encoded image data, based on a correlation between a plurality of macroblocks included in each of the plurality of partition slices, wherein at least two macroblocks, included in each of at least two partition slices among the plurality of partition slices, correlate with each other.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
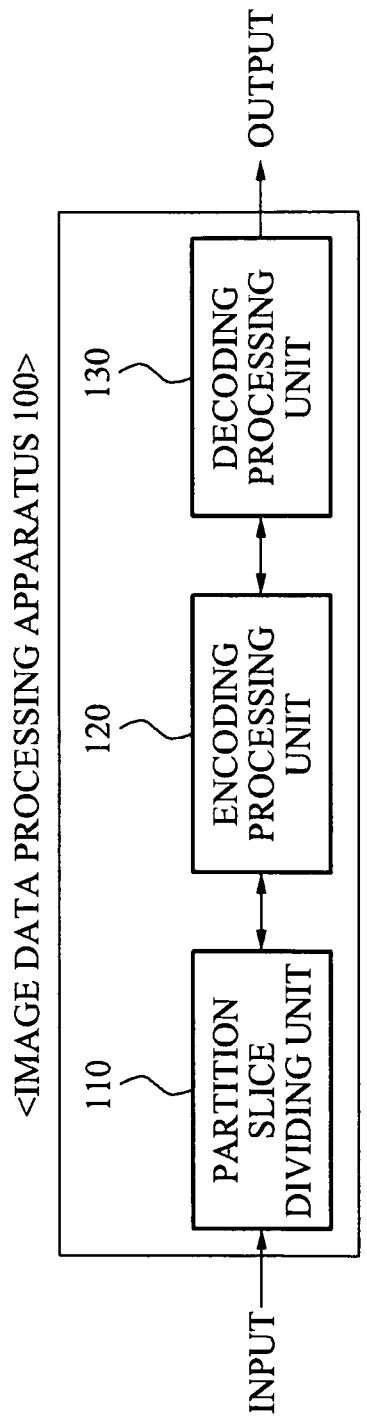
FIG. 1 illustrates a block diagram of an image data processing apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of an image data processing apparatus 100 according to example embodiments.

Referring to FIG. 1, the image data processing apparatus 100 may include, for example, a partition slice dividing unit 110, an encoding processing unit 120, and a decoding processing unit 130, in order to perform parallel processing while maintaining advantages of conventional slices.

The encoding processing unit 120 and the decoding processing unit 130 may be individually configured as independent hardware or may be embodied within the same device.

To efficiently encode and decode image data having a high resolution, the partition slice dividing unit 110 may divide image data into a plurality of partition slices.

The image data processing apparatus 100 may be applied to a multi-core apparatus by maximizing a parallel processability and by enabling data reference between the plurality of partition slices.

The plurality of partition slices may be used as units for logically dividing the image data, and two neighboring partition slices among the plurality of partition slices may correlate with each other.

The encoding processing unit 120 may encode the image data based on the plurality of partition slices into which the image data is divided.

Specifically, the encoding processing unit 120 may encode the image data based on the plurality of partition slices, or based on a correlation between macroblocks included in each of the plurality of partition slices.

Here, information regarding correlation of the image data may be verified based on a type or characteristics of initial image data.

For example, in general image data having '6×4' blocks, a left block, an upper left block, an upper block, and an upper right block among neighboring blocks that enclose a predetermined block may have a correlation with the predetermined block.

Additionally, in an intra prediction vertical mode of H.264, only blocks located on a left side of a predetermined block may correlate with each other.

Accordingly, a correlation between blocks of image data may be verified in advance.

The decoding processing unit 130 may decode, in parallel, the encoded image data, based on a correlation between the at least two macroblocks included in each of the plurality of partition slices.

For example, the decoding processing unit 130 may decode, in parallel, macroblocks in the first partition slice that do not correlate with macroblocks in a second partition slice adjacent to the first partition slice.

When either a first macroblock or a second macroblock is completely decoded, the decoding processing unit 130 may process decoding of the other macroblock. Here, the first macroblock and the second macroblock may correlate with each other in the first partition slice and the second partition slice adjacent to the first partition slice.

According to example embodiments, to increase parallel processability while maintaining advantages of conventional slices, data reference between slices may be enabled, and parallel processing may also be enabled.

In other words, according to example embodiments, since a correlation between slices is maintained, data reference between the slices may be performed. Additionally, macroblocks that do not correlate with each other may be processed in parallel and thus, it is possible to prevent a degradation in an image quality.

Figure 2:
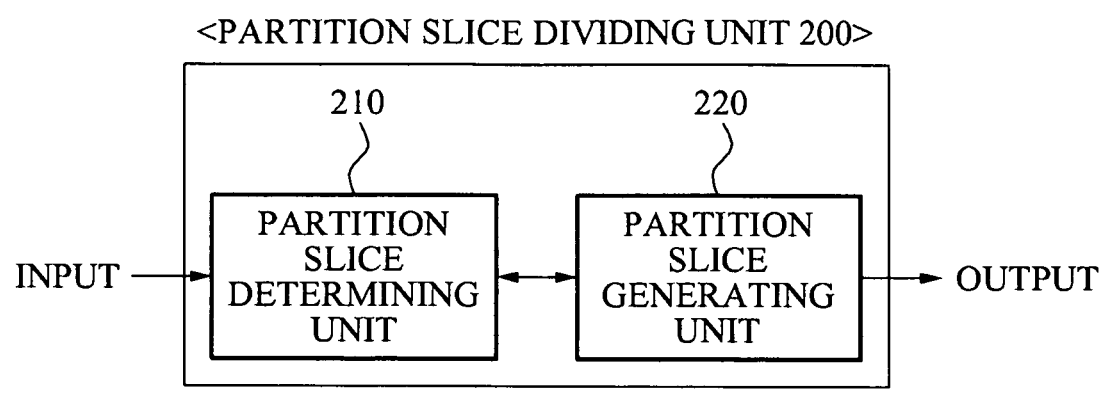
FIG. 2 illustrates a block diagram of a partition slice dividing unit according to example embodiments.

FIG. 2 illustrates a block diagram of a partition slice dividing unit 200 according to example embodiments.

Referring to FIG. 2, the partition slice dividing unit 200 may include, for example, a partition slice determining unit 210, and a partition slice generating unit 220.

The partition slice determining unit 210 may determine a partition pattern used to divide input image data into partition slices.

For example, the partition slice determining unit 210 may determine the partition pattern, based on a number of cores for image processing.

The determined partition pattern will be further described below with reference to FIGS. 4 through 6.

Subsequently, the partition slice generating unit 220 may divide the image data into a plurality of partition slices based on the determined partition pattern.

The plurality of partition slices may be virtual logical regions used to process decoding in parallel, and may contribute to an improvement of a processing speed by parallel processing, without reducing characteristics of image data.

Additionally, when the plurality of partition slices are used, the image data may be decoded based on a correlation between macroblocks. Thus, it is possible to improve an image quality of the image data.

Figure 3:
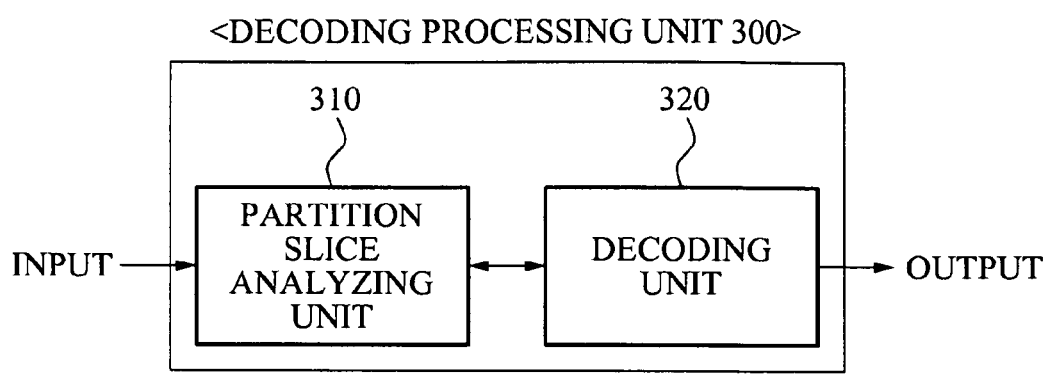
FIG. 3 illustrates a block diagram of a decoding processing unit according to example embodiments.

FIG. 3 illustrates a block diagram of a decoding processing unit 300 according to example embodiments.

The decoding processing unit 300 may decode, in parallel, an encoded image data, based on a correlation between a plurality of macroblocks included in each of a plurality of partition slices into which the image data is divided.

Referring to FIG. 3, the decoding processing unit 300 may include, for example, a partition slice analyzing unit 310, and a decoding unit 320.

The partition slice analyzing unit 310 may analyze pieces of information pertaining to the plurality of partition slices. The decoding unit 320 may process decoding using the analyzed information.

Here, the decoding unit 320 may decode parallel processable macroblocks based on the analyzed information, simultaneously or substantially simultaneously, namely, in parallel.

For example, the plurality of partition slices may include a first partition slice and a second partition slice.

In this example, when decoding of a first macroblock in the first partition slice is terminated, the decoding unit 320 may process decoding of a second macroblock in the second partition slice, based on the analyzed information. Here, the second macroblock may correlate with the first macroblock.

After the second macroblock is decoded, the decoding unit 320 may process decoding of other macroblocks in the second partition slice, based on the analyzed information.

Additionally, while decoding the second macroblock, the decoding unit 320 may decode a third macroblock in the first partition slice that does not correlate with the macroblocks in the second partition slice.

In other words, it is possible to parallel process macroblocks after a delay equal to a time for decoding the first macroblock.

Accordingly, an image data processing apparatus according to example embodiments may be used to decode in parallel image data and thus, it is possible to improve a processing speed for encoding and decoding.

Additionally, an image data processing apparatus according to example embodiments may be used to encode and decode in parallel blocks and thus, it is possible to reduce memory utilization, thereby efficiently using the overall system resources.

Figure 4:
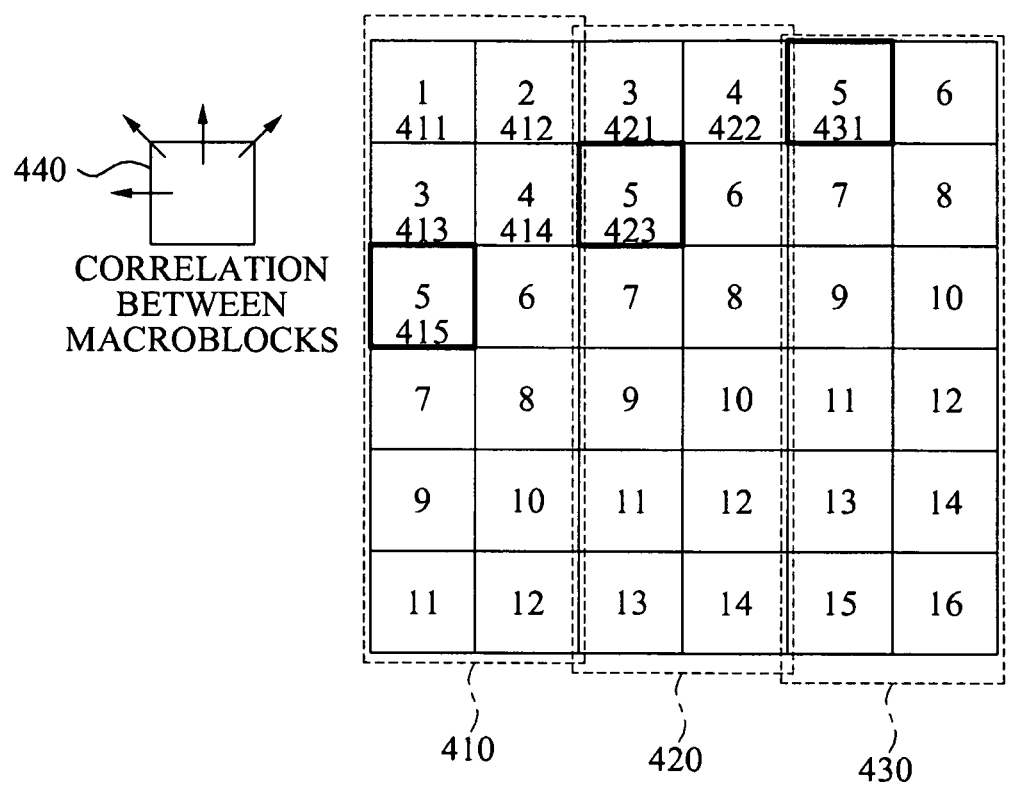
FIGS. 4 through 6 illustrate examples of image data divided into partition slices according to example embodiments.
Figure 5:
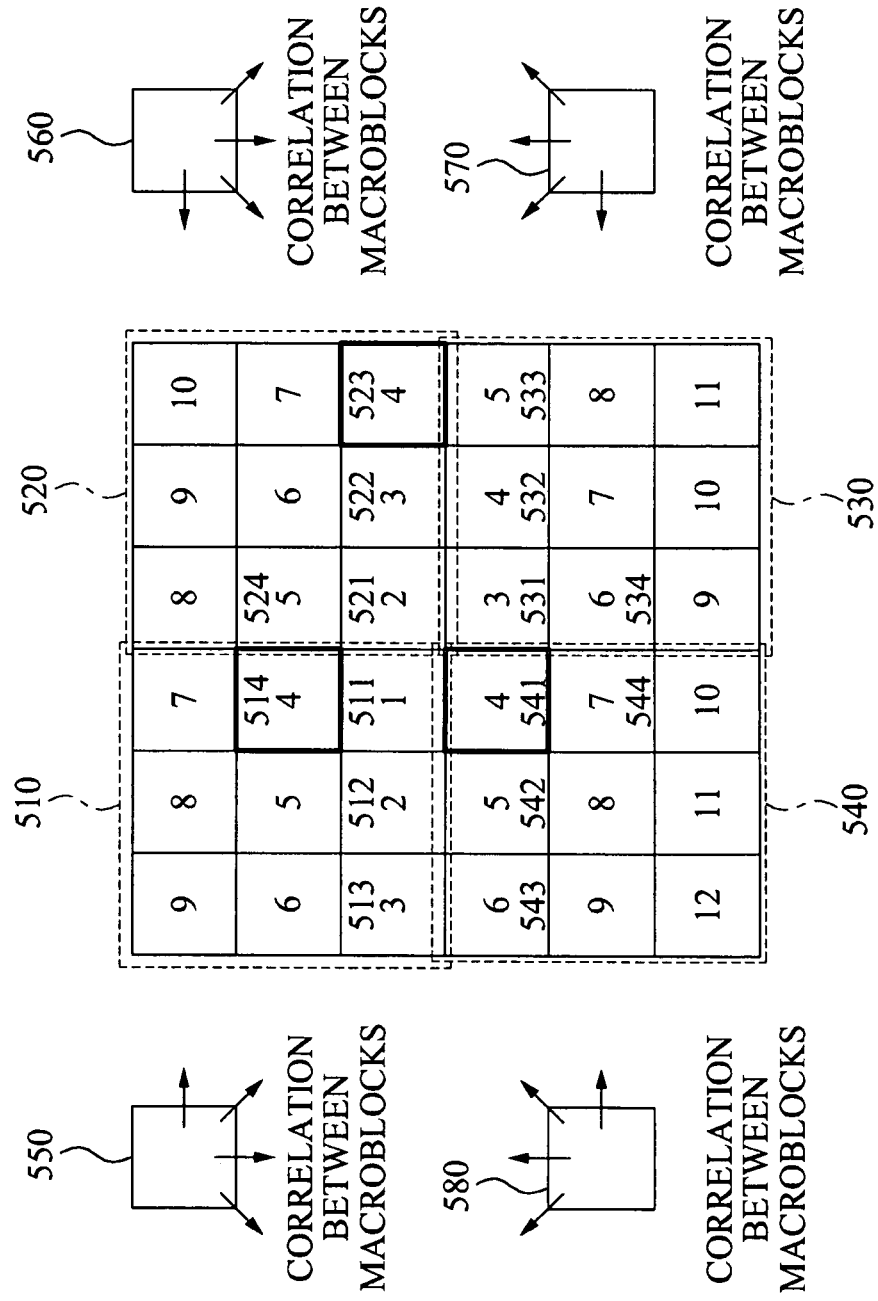
Figure 6:
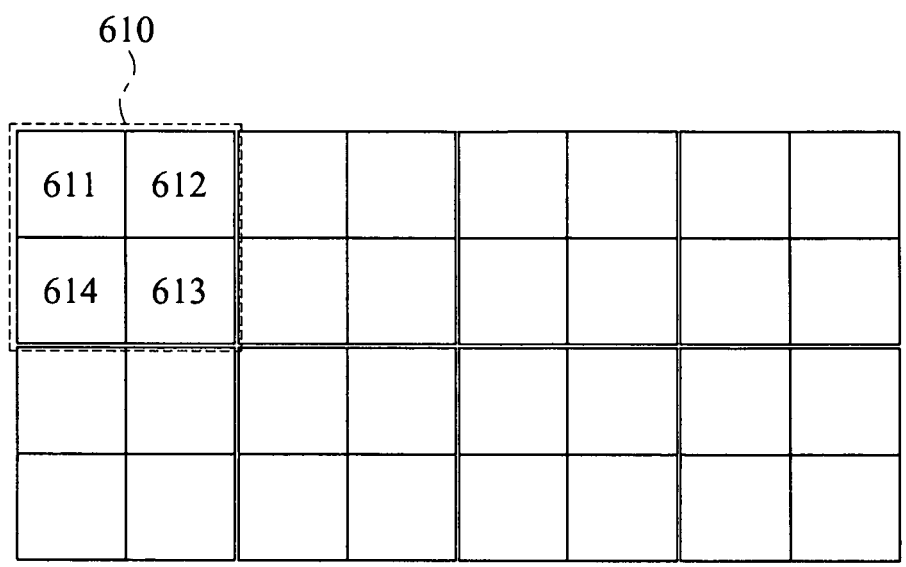

FIGS. 4 through 6 illustrate examples of image data divided into partition slices according to example embodiments.

Referring to FIGS. 4 and 5, numerals in macroblocks indicate a decoding order of the macroblocks.

In FIG. 4, a partition slice dividing unit according to example embodiments may divide input image data 400 into a plurality of partition slices in a longitudinal direction.

The image data 400 may also be divided in a transverse direction, however, only an example of dividing image data in the longitudinal direction is described herein.

Specifically, the partition slice dividing unit may divide the image data 400 into three partition slices, for example a first partition slice 410, a second partition slice 420, and a third partition slice 430, each in the longitudinal direction.

Similarly, the three partition slices may be used as units for logically dividing the image data 400, and may not necessarily affect characteristics of the image data 400.

Additionally, due to the characteristics of the image data 400, neighboring macroblocks in each of two neighboring partition slices among the three partition slices may correlate with each other.

Referring to reference numeral 440 of FIG. 4, each of the macroblocks may correlate with a left mcroblock, an upper left macroblock, an upper macroblock, and an upper right macroblock.

A decoding processing unit according to example embodiments may process decoding of the image data 400 for each partition slice, and may process a portion of the macroblocks in parallel.

Specifically, the decoding processing unit may first decode a first macroblock 411 in the first partition slice 410.

Subsequently, the decoding processing unit may terminate decoding of the first macroblock 411, and may then decode a second macroblock 412 that correlates with the first macroblock 411.

Here, in the image data, macroblocks that correlate with each other may not be simultaneously decoded. After a previous macroblock is decoded in advance, a next macroblock may be decoded based on the previous macroblock.

In other words, after decoding of a macroblock is terminated, another macroblock that correlates with the macroblock may be decoded.

When decoding of the second macroblock 412 is completed, the decoding processing unit may decode a third macroblock 421 included in the second partition slice 420, based on a correlation between the second macroblock 412 and the third macroblock 421.

Here, the decoding processing unit may decode the third macroblock 421 and a fourth macroblock 413, simultaneously, namely in parallel.

Since the fourth macroblock 413 is not adjacent to a partition slice, and does not correlate with the third macroblock 421, the third macroblock 421 and the fourth macroblock 413 may be simultaneously decoded.

When the third macroblock 421 and the fourth macroblock 413 are completely decoded in parallel, the decoding processing unit may decode a fifth macroblock 414.

Similarly, the decoding processing unit may decode a sixth macroblock 422 together with the fifth macroblock 414. Here, the sixth macroblock 422 may not correlate with the fifth macroblock 414.

When the fifth macroblock 414 and the sixth macroblock 422 are completely decoded, the decoding processing unit may decode a seventh macroblock 415, an eighth macroblock 423, and a ninth macroblock 431, simultaneously, namely in parallel, based on a correlation between the seventh macroblock 415, the eighth macroblock 423, and the ninth macroblock 431.

Specifically, the decoding processing unit may independently decode the seventh macroblock 415 that is not adjacent to a partition slice, and may decode the eighth macroblock 423 based on the fifth macroblock 414 that is already decoded. Similarly, the decoding processing unit may decode the ninth macroblock 431 based on the sixth macroblock 422 that is already decoded.

As described above, the image data 400 of FIG. 4 is divided into the partition slices in the longitudinal direction. The image data 400 of FIG. 4 may be processed, for example, by an image data processing apparatus where three cores are used for decoding.

Input image data 500 of FIG. 5 and input image data of FIG. 6 may be processed, for example, by an image data processing apparatus where at least four cores are used. Each of the image data 500 and 600 may be divided into at least four partition slices.

Referring to FIG. 5, a partition slice dividing unit according to example embodiments may divide the image data 500 into four partition slices.

Specifically, the partition slice dividing unit may divide the image data 500 into four partition slices, for example, a first partition slice 510, a second partition slice 520, a third partition slice 530, and a fourth partition slice 540.

The four partition slices may be used as units for logically dividing the image data 500, and may not affect characteristics of the image data 500. Additionally, due to the characteristics of the image data 500, neighboring macroblocks in each of two neighboring partition slices among the four partition slices may correlate with each other.

Referring to reference numeral 550 of FIG. 5, each of the macroblocks in the first partition slice 510 may correlate with a lower left macroblock, a lower macroblock, a lower right macroblock, and a right macroblock.

Referring to reference numeral 560 of FIG. 5, each of the macroblocks in the second partition slice 520 may correlate with a left macroblock, a lower left macroblock, a lower macroblock, and a lower right macroblock.

Referring to reference numeral 570 of FIG. 5, each of the macroblocks in the third partition slice 530 may correlate with a left macroblock, an upper left macroblock, an upper macroblock, and an upper right macroblock.

Referring to reference numeral 580 of FIG. 5, each of the macroblocks in the fourth partition slice 540 may correlate with an upper left macroblock, an upper macroblock, an upper right macroblock, and a right macroblock.

Subsequently, a decoding processing unit according to example embodiments may process decoding of the image data 500 for each partition slice, and may process a portion of the macroblocks in parallel.

Specifically, the decoding processing unit may first decode a first macroblock 511 in the first partition slice 510. Subsequently, the decoding processing unit may sequentially decode a second macroblock 512, a third macroblock 513, and a fourth macroblock 514 that are included in the first partition slice 510.

The decoding processing unit may sequentially decode a fifth macroblock 521, a sixth macroblock 522, a seventh macroblock 523, and an eighth macroblock 524 that are included in the second partition slice 520.

The decoding processing unit may sequentially decode a ninth macroblock 531, a tenth macroblock 532, an eleventh macroblock 533, and a twelfth macroblock 534 that are included in the third partition slice 530.

The decoding processing unit may sequentially decode a thirteenth macroblock 541, a fourteenth macroblock 542, a fifteenth macroblock 543, and a sixteenth macroblock 544 that are included in the fourth partition slice 540.

The decoding processing unit may decode the first macroblock 511, and may then decode the second macroblock 512 based on the first macroblock 511, according to a correlation between the macroblocks.

Additionally, the decoding processing unit may decode the fifth macroblock 521 while decoding the second macroblock 512. In other words, since the second macroblock 512 does not correlate with the fifth macroblock 521, the second macroblock 512 and the fifth macroblock 521 may be decoded simultaneously, namely, in parallel.

When the second macroblock 512 and the fifth macroblock 521 are completely decoded, the decoding processing unit may decode, in parallel, the third macroblock 513, the sixth macroblock 522, and the ninth macroblock 531.

Similarly, since the third macroblock 513, the sixth macroblock 522, and the ninth macroblock 531 do not correlate with each other, the third macroblock 513, the sixth macroblock 522, and the ninth macroblock 531 may be simultaneously decoded.

Additionally, according to a correlation between macroblocks included in each of the four partition slices, the third macroblock 513 may be decoded based on the second macroblock 512 that is already decoded, and the sixth macroblock 522 may be decoded based on the fifth macroblock 521 that is already decoded. Also, the ninth macroblock 531 may be decoded based on the first macroblock 511 or the fifth macroblock 521 that is already decoded.

Accordingly, it is possible to decode, in parallel, the macroblocks other than the first macroblock 511 that is initially decoded. In other words, the macroblocks other than the first macroblock 511 may be decoded in parallel after a delay equal to a time for decoding the first macroblock 511.

The image data 600 of FIG. 6 may be interpreted as an example obtained by applying the example of FIG. 5.

Referring to FIG. 6, the image data 600 may be divided into a plurality of partition slices, instead of being divided into four partition slices based on a number of cores. Additionally, each of the plurality of partition slices may also be divided into four partition slices. For example, a partition slice 610 may be divided into four partition slices 611, 612, 613, and 614.

Here, only a single macroblock may be first independently decoded, and other macroblocks may be simultaneously decoded, in a similar manner to the example of FIG. 5.

Accordingly, decoding may be rapidly processed.

Thus, according to example embodiments, image data may be decoded in parallel and thus, it is possible to improve a processing speed for encoding and decoding.

Additionally, according to example embodiments, blocks may be encoded and decoded in parallel and thus, it is possible to reduce memory utilization, thereby efficiently using the overall system resources.

Figure 7:
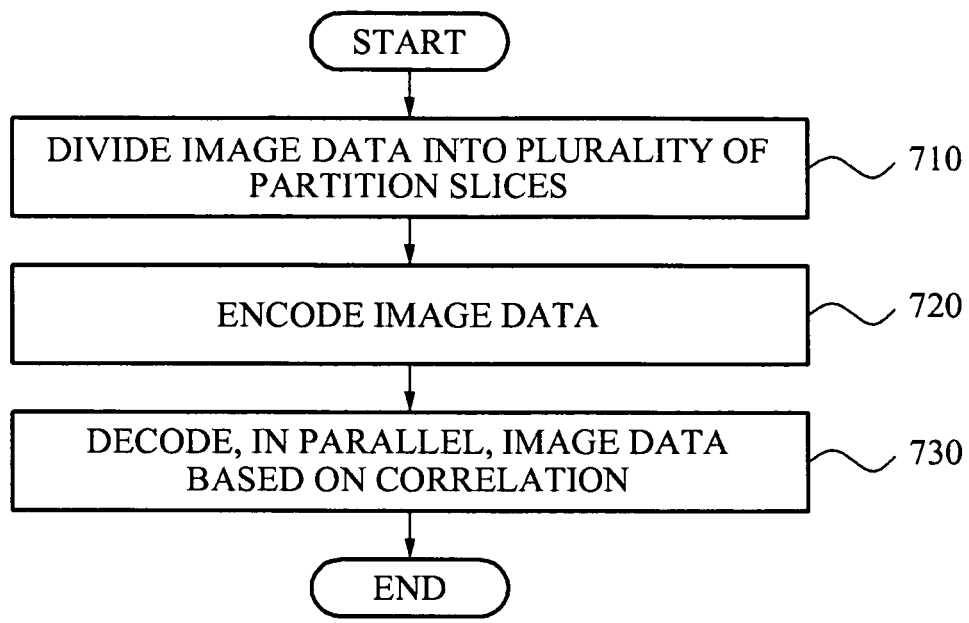
FIG. 7 illustrates a flowchart of a method of operating an image data processing apparatus according to example embodiments.

FIG. 7 illustrates a flowchart of an operating method according to example embodiments, for example, a method of operating an image data processing apparatus.

In operation 710, input image data may be divided into a plurality of partition slices.

Here, at least two macroblocks included in each of at least two partition slices among the plurality of partition slices may correlate with each other.

In operation 720, the image data may be encoded based on the plurality of partition slices into which the image data is divided.

In operation 730, the encoded image data may be decoded, in parallel, based on a correlation between the at least two macroblocks included in each of the plurality of partition slices.

The plurality of partition slices may include a first partition slice, and a second partition slice.

In operation 730, when decoding of a first macroblock in the first partition slice is terminated, decoding of a second macroblock in the second partition slice that correlates with the first macroblock may be processed.

Additionally, after the second macroblock is decoded, decoding of other macroblocks in the second partition slice may be processed.

When the second macroblock is being decoded, a third macroblock in the first partition slice may be decoded. Here, the third macroblock may not correlate with the macroblocks in the second partition slice.

Thus, it is possible to decode, in parallel, macroblocks while maintaining a correlation between the macroblocks, using the exemplary method of FIG. 7.

Figure 8:
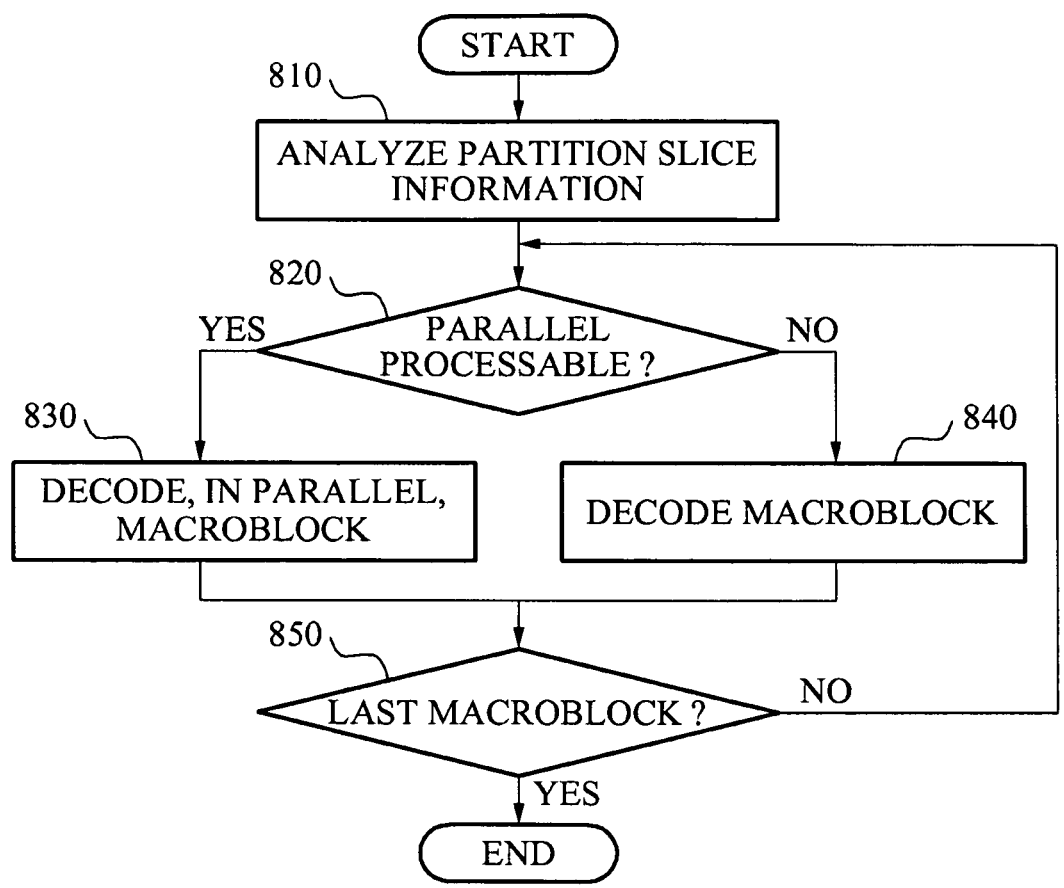
FIG. 8 illustrates a flowchart of an operation of decoding partition slices according to example embodiments.

FIG. 8 illustrates a flowchart of an operation of decoding partition slices according to example embodiments.

In operation 810, partition slice information may be analyzed, in order to decode input image data.

The partition slice information may be analyzed based on information that is initially input and divided.

In other words, in operation 810, a partition pattern used to divide input image data into partition slices may be analyzed.

In operation 820, whether at least one macroblock is parallel processable may be determined based on the analyzed partition slice information.

When it is determined that the at least one macroblock is parallel processable, the at least one macroblock may be decoded in parallel in operation 830.

Conversely, when it is determined that the at least one macroblock is not parallel processable, only a corresponding macroblock may be decoded in operation 840.

When a current macroblock is completely decoded, whether the current macroblock is a last macroblock may be determined in operation 850.

When the current macroblock is the last macroblock, the decoding may be terminated. When the current macroblock is not the last macroblock, the method may return to operation 820. In operation 820, whether a next macroblock is parallel processable may be determined again.

In a method of processing image data operating an image data processing apparatus according to example embodiments, whether decoding of previous blocks is terminated may be determined, in order to process the decoding. When it is determined that the decoding of the previous blocks is not terminated, whether the decoding of the previous blocks is terminated may be continuously determined. When it is determined that the decoding is terminated, an input bitstream may be decoded, and may store information regarding a number of parallel decodable blocks, a motion vector, an encoded block bitstream syntax, such as a transform coefficient and the like, and a location of a block in an image.

When a method of processing image data operating an image data processing apparatus according to example embodiments is used, an encoding order may be determined based on a correlation between blocks during encoding and decoding of image data and thus, it is possible to process the blocks in parallel. Additionally, the blocks may be encoded and decoded in parallel and thus, it is possible to reduce memory utilization, thereby improving the entire processing speed.

The methods of processing image data according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The methods of processing image data described herein may be executed on a general purpose computer or processor or may be executed on a particular machine such as the image data processing apparatus described herein.

Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that module or by a processor common to one or more of the modules.

According to example embodiments, data reference between slices, and parallel processing may be enabled.

Additionally, according to example embodiments, it is possible to process in parallel image data, without degrading an image quality due to slices into which the image data is divided during encoding of the image data.

Furthermore, according to example embodiments, image data may be decoded in parallel and thus, it is possible to improve a processing speed for encoding and decoding.

Moreover, according to example embodiments, blocks may be encoded and decoded in parallel and thus, it is possible to reduce memory utilization, thereby efficiently using the overall system resources.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image data processing apparatus, comprising:
   a processor to control one or more processor-executable units;
   a partition slice dividing unit to divide image data of a video frame into a plurality of partition slices, wherein a first macroblock included in a first partition slice of the plurality of partition slices correlates with a second macroblock included in a second partition slice of the plurality of partition slices; and
   an encoding processing unit to encode the image data based on the plurality of partition slices;
   a decoding processing unit to determine, prior to decoding, whether the first macroblock correlates with the second macroblock;
   the decoding processing unit to decode the first macroblock, and then to decode the second macroblock that has been determined as being correlated with the first macroblock and to decode, in parallel with the decoding of the first and second macroblock, macroblocks in the first partition slice and macroblocks in the second partition slice other than the first macroblock and the second macroblock
   wherein a first correlation of the macroblocks in the first partition slice and a second correlation of the macroblocks in the second partition slice differ from each other and,
   the decoding processing unit determines a decoding order of the macroblocks in the first partition slice and the macroblocks in the second partition slice by using both the first correlation and the second correlation.

2. The image data processing apparatus of claim 1, wherein the plurality of partition slices are used as units for logically dividing the image data, and two neighboring partition slices among the plurality of partition slices correlate with each other.

3. The image data processing apparatus of claim 1, wherein, when decoding of the first macroblock in the first partition slice is terminated, the decoding processing unit processes decoding of the second macroblock in the second partition slice that has been determined as being correlated with the first macroblock.

4. The image data processing apparatus of claim 3, wherein the decoding processing unit processes decoding of macroblocks in the first and second partition slice other than the first macroblock and the second macroblock after decoding the second macroblock.

5. The image data processing apparatus of claim 3, wherein the decoding processing unit decodes a third macroblock in the first partition slice that does not correlate with the macroblocks in the second partition slice, while decoding the second macroblock.

6. The image data processing apparatus of claim 1, wherein the partition slice dividing unit divides the image data into a plurality of partition slices in a longitudinal direction.

7. A method of processing image data of a video frame, the method comprising:
   dividing the image data of the video frame into a plurality of partition slices;
   encoding, by way of a processor, the image data based on the plurality of partition slices, wherein a first macroblock included in a first partition slice of the plurality of partition slices correlates with a second macroblock included in a second partition slice of the plurality of partition slices;
   determining, prior to decoding, whether a first macroblock included in a first partition slice of the plurality of partition slices correlates with a second macroblock included in a second partition slice of the plurality of partition slices;
   decoding the first macroblock, and then decoding the second macroblock that has been determined as being correlated with the first macroblock;
   decoding, in parallel with the decoding of the first and second macroblock, macroblocks in the first partition slice and macroblocks in the second partition slice other than the first macroblock and the second macroblock, wherein a first correlation of the macroblocks in the first partition slice and a second correlation of the macroblocks in the second partition slice differ from each other; and
   determining a decoding order of the macroblocks in the first partition slice and macroblocks in the second partition slice by using both the first correlation and the second correlation that differ from each other.

8. The method of claim 7, wherein the decoding further comprises:
   when decoding of the first macroblock in the first partition slice is terminated, the second macroblock in the second partition slice that has been determined as being correlated with the first macroblock is decoded; and
   the macroblocks in the first and second partition slice other than the first macroblock and the second macroblock are decoded after decoding the second macroblock.

9. The method of claim 7, wherein the decoding further comprises decoding a third macroblock in the first partition slice that does not correlate with the macroblocks in the second partition slice, while decoding the second macroblock.

10. The method of processing image data of claim 7, wherein in the dividing of the image data into a plurality of partition slices, the image data is divided into a plurality of partition slices in a longitudinal direction.

11. An image data processing apparatus, comprising:
    a processor to control one or more processor-executable units;
    a partition slice dividing unit to divide image data of a video frame into a quantity of partition slices, wherein the partition slice dividing unit selects the quantity of the partition slices based on a quantity of cores available for image data processing;
    an encoding processing unit to encode the image data based on the plurality of partition slices, wherein at least two macroblocks, included in each of at least two partition slices among the plurality of partition slices, correlate with each other, wherein the partition slice includes a first partition slice and a second correlation, and wherein a first correlation of macroblocks in the first partition slice and the second correlation of macroblocks in a second partition slice differ from each other; and a decoding processing unit to determine a decoding order of the macroblocks in the first partition slice and the macroblocks in the second partition slice by using both the first correlation and the second correlation that differ from each other.

12. The image data processing apparatus of claim 11, wherein the partition slice dividing unit divides the image data into a plurality of partition slices in a longitudinal direction.

* * * * *